May 2, 1939.  L. J. WESTER  2,156,888
COOLING APPARATUS
Filed May 19, 1938  2 Sheets-Sheet 1

Inventor
L. J. Wester
By L. F. Randolph
Attorney

May 2, 1939.　　　　　L. J. WESTER　　　　　2,156,888
COOLING APPARATUS
Filed May 19, 1938　　　　2 Sheets-Sheet 2

Inventor
L. J. Wester
By L. F. Randreth
Attorney

Patented May 2, 1939

2,156,888

UNITED STATES PATENT OFFICE 2,156,888

COOLING APPARATUS

Lou J. Wester, Indio, Calif.

Application May 19, 1938, Serial No. 208,926

1 Claim. (Cl. 261—106)

This invention relates to an air cooling or conditioning apparatus for rooms or buildings and employing a moistened filter wall through which the air is drawn to be cooled and moistened before being expelled into the area or space to be cooled.

Air conditioning apparatus have been in use for a long time employing a wall or unit having openings or other means to permit the air to be drawn therethrough and containing a filler adapted to be kept in a moist condition by any suitable means, so that the air drawn through the filter wall or wall will be moistened or cooled thereby. These apparatus all employ a suction fan which draws the air through the filter wall, and since the suction of the fan decreases greatly so that the farther removed that the wall is from the axis of the fan, the less air will be sucked through the wall thereby. The conventional cooling apparatus have employed flat walls either behind the fan or to the rear and on either side thereof, so that substantially all of the air is drawn through the filter wall from one, two or three points, while the remaining portion of the wall filters practically no air. It will thus be seen, that the greater portion of the filter wall which is most remote to the axis of the fan will filter practically no air while the portion of the wall nearest the fan will filter all the air, and as a result, the air passing through the portion nearest the fan will quickly remove the moisture therefrom so that the apparatus will have only a very slight humidifying effect.

It is therefore an aim of this invention to provide a cooling and humidifying apparatus having a filtering unit or wall all points of which are disposed substantially an equal distance from the axis of the fan blade.

It is a further object of this invention to provide an improved cooling apparatus which will be economical to construct, very durable, and capable of being constructed in a variety of sizes to adapt to use with buildings or rooms of various sizes; it being a particular object of the invention to provide portable units which may be readily connected to or disconnected from small buildings or rooms.

It is a further object of this invention to provide an improved cooling apparatus having a very simple yet efficient means of supplying water or other liquids to the humidifying filler with or without connecting the device to a water supply tank, including means for efficiently disposing of the cooling fluid which is not used.

Other objects and advantages of the invention will hereinafter become more fully apparent from the following description of the drawings which illustrate a preferred form of the invention, and wherein:—

Figure 1:
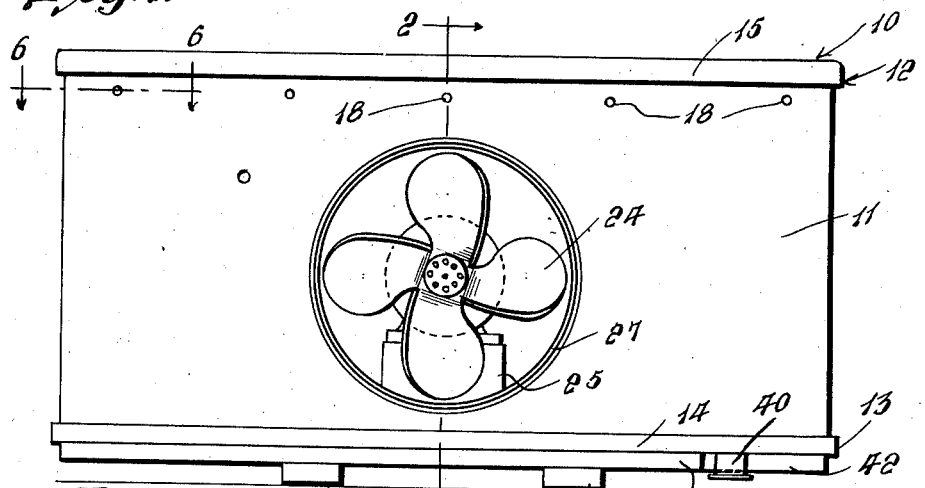
Figure 1 is a front elevational view of the cooling apparatus.
Figure 2:
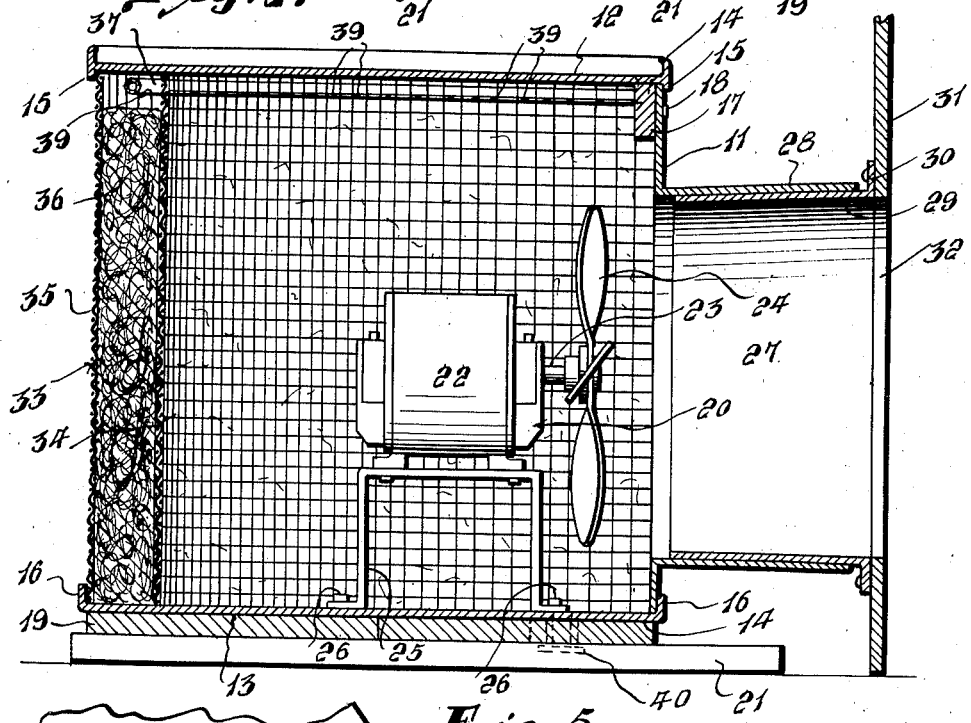
Figure 2 is a vertical sectional view taken on the line 2—2 of Figure 1.
Figure 5:
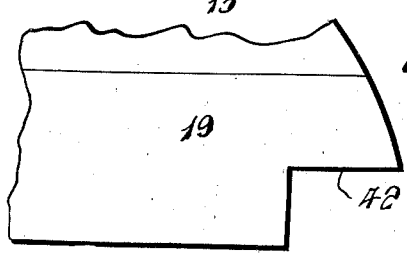
Figure 5 is a fragmentary top plan view of the base.

Referring more particularly to the drawings, wherein like reference characters designate like or corresponding parts throughout the different views, 10 designates generally the casing of the cooling apparatus, and includes the front wall 11 and the semi-circular shaped top and bottom walls 12 and 13 respectively, the straight sides 14 of which are connected to the upper and lower edges of the front wall 11. Top 12 is provided with a flange 15 extending around its edges and projecting upwardly and downwardly therefrom as best seen in Figure 2, while the bottom 13 is provided with an upset flange 16 entirely surrounding it. The front wall 11 extends up inside of the flange 15 and down inside of the flange 16, as seen in Figure 2. A beam or board 17 extends substantially across the upper edge of wall 11 on its inner side and is secured thereto by the fastenings 18 for a purpose which will hereinafter be described. A base 19 is suitably secured to the under side of bottom 13, and is preferably formed of a fibrous material such as wood to cushion the casing 10 which has the front wall 11, top and bottom 12 and 13 respectively, preferably formed of sheet metal, to prevent vibration caused by the fan, designated generally 20. Bottom 19 is preferably mounted on a pair of spaced sills 21 which cooperate in cushioning any vibration of casing 10.

The fan 20 includes motor 22 which drives the shaft 23, to which is keyed the fan blades 24. Motor 22 is preferably mounted on a stand or bracket 25 secured to bottom 13 and base 19 by the fastening 26. The front wall 11 is provided with an outlet 27, disposed in front of the fan blades 24 and formed of the telescopic sections 28 and 29 the latter of which is provided with a flange 30 adapted to be secured to a wall 31 around an opening 32 therein, with which the outlet 27 is aligned. Wall 31 is intended to indicate a wall of a building, room or other enclosure which the cooling apparatus is intended to cool.

Figure 4:
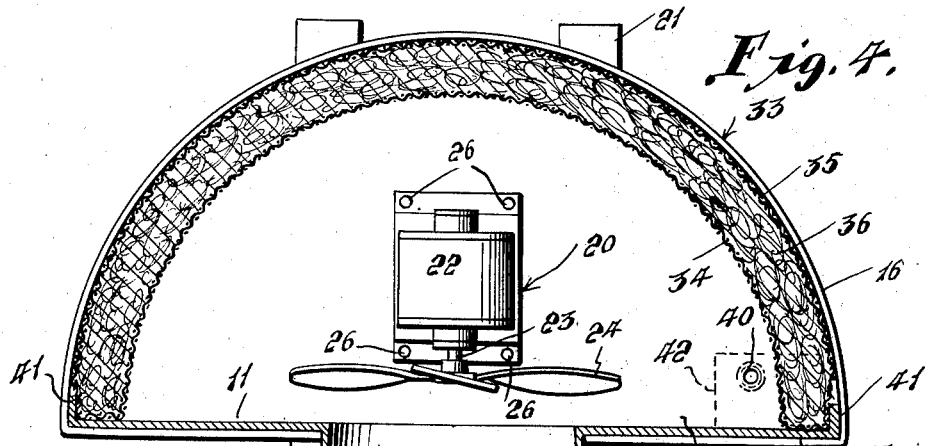
Figure 4 is a horizontal sectional view of the same with the fan and motor shown as a top plan view.

The principal feature of the invention, is the filter wall or unit designated generally 33, which is arcually shaped as seen in Figure 4, having its opposite ends abutting against the ends of the front wall 11, and extending around the semi-circular shaped portion of the top 12 and bottom 13 with its outer edge in engagement with the depending portion of flange 15 and with the flange 16. Filter wall 33, thus forms the sides and rear of the casing 10. Wall 33 is preferably formed of the inner and outer layers 34 and 35 of mesh wire fabric, which are spaced from each other to receive the filler 36 which is loosely packed between layers 34 and 35 leaving a small space at the top of the wall for a pipe 37. Filler 36 may be formed of any suitable filtering material such as excelsior or the like, which may be packed sufficiently loose so that air can readily pass therethrough, but which will readily retain moisture.

Figure 3:
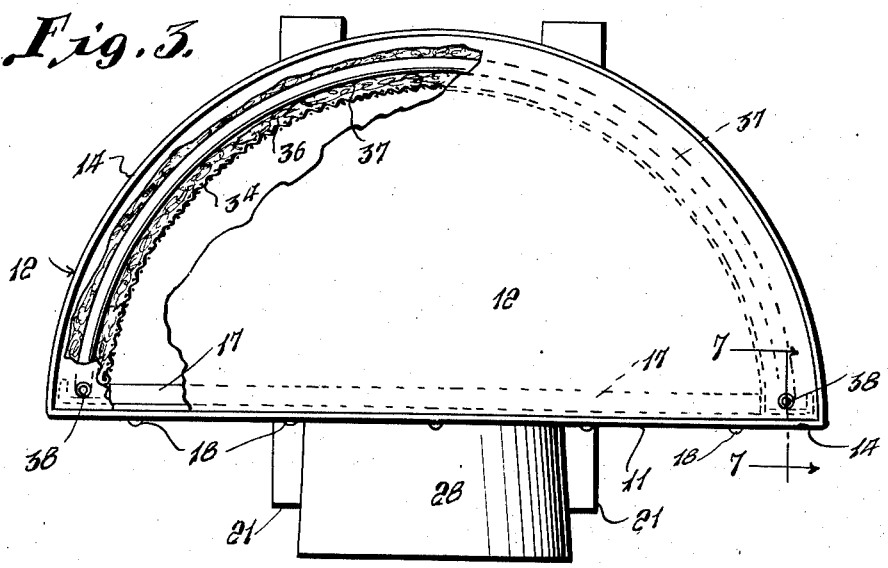
Figure 3 is a top plan view of the apparatus shown partly in sections.

Pipe 37 as best seen in Figure 3, is arcually shaped to extend through the upper part of wall 33 and has its opposite upturned ends mounted in openings 38 of the top 12, as best seen in Figurges 3 and 7. Pipe 37 is provided with a plurality of spaced apertures or perforations 39 in its under side to dispense water or other cooling fluid to the filler 36, in small quantities. Openings 38 may be connected with a water pipe, or in the small portable units such as illustrated in the drawings, top 12 and the upset portion of flange 15 can be used as a pan into which a supply of water may be poured and dispensed through openings 38 and perforations 39. Any liquid from pipe 37 which is not taken up by the air passing through wall 33, will be deposited into the bottom 13 from whence it can be drained through the outlet 40 from time to time.

Figures 6, 7:
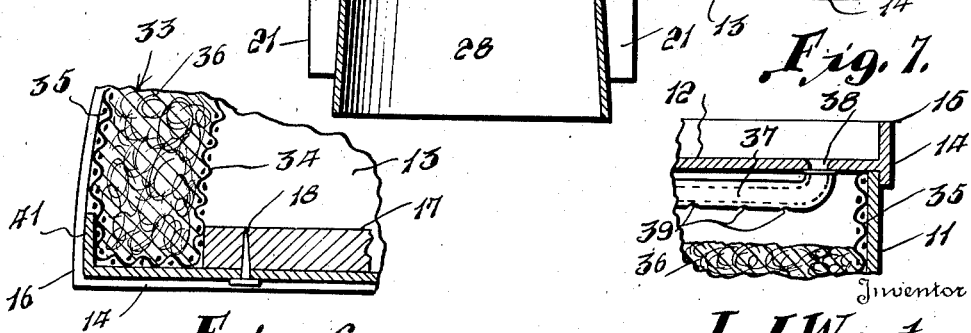
Figure 6 is a horizontal sectional view taken on the line 6—6 of Figure 1.
Figure 7 is a vertical sectional view taken on the line 7—7 of Figure 3.

In the preferred form of construction of the apparatus, front wall 11 is provided with the inturned ends 41, as seen in Figure 4, which engage against the outer edge of the ends of wall 33, while the beam 17, as seen in Figures 3 and 6, engages the opposite side of the wall 33 to clamp its ends therebetween. Base 19 is preferably formed of the cutout portion 42 at one corner to accommodate the outlet or drain pipe 40, as seen in Figure 4.

From the foregoing it will be seen, that the air filter wall 33 is semi-circular in shape so that all the portions of the wall are in the same horizontal plane as the axis of the fan blades 24 is approximately the same distance from the axis of the fan, so that the air drawn into casing 10 by the fan will be drawn in equally through all parts of the wall to take up substantially the same amount of moisture from the filter material 36 so that the air expelled through outlet 27 will be of a uniform humidity. The perforations 39 in pipe 37 may decrease in size from the intermediate portion of the pipe toward the ends, if necesary, to equalize the amount of liquid dispensed onto the filter material 36. While it is true that less air will be drawn through the top and bottom part of the wall 33, this will not make any appreciable difference since the moisture will be passing downwardly through the filter material so that the moisture content thereof will be uniform intermediate its top and bottom or at the point through which most of the air will be drawn.

Various modifications and changes in the details of construction of the apparatus may obviously be made and are contemplated without departing from the principle of the invention, particularly so far as it relates to the relative position of the filter wall and the axis of the fan, and the right is therefore expressly reserved to make such variations and changes as do not depart from the spirit and scope of the invention as hereinafter defined by the appended claim.

I claim as my invention:

A cooling unit comprising a casing having a semi-circular top and bottom provided with upset marginal flanges forming pans, a front wall provided with an outlet, a fan mounted in said casing behind said outlet, a semi-circular filter wall disposed between said top and bottom and extending from one end to the other of said front wall, said fan being axially disposed relatively to the filter wall, and an arcuately shaped perforated pipe extending around the upper part of said filter wall and connected at its ends to said top, said top being adapted to contain a supply of water and having openings communicating with the ends of said pipe for supplying water, through said perforations, to the filter wall, and said bottom forming a pan to catch and retain the unused water.

LOU J. WESTER.